UNITED STATES PATENT OFFICE.

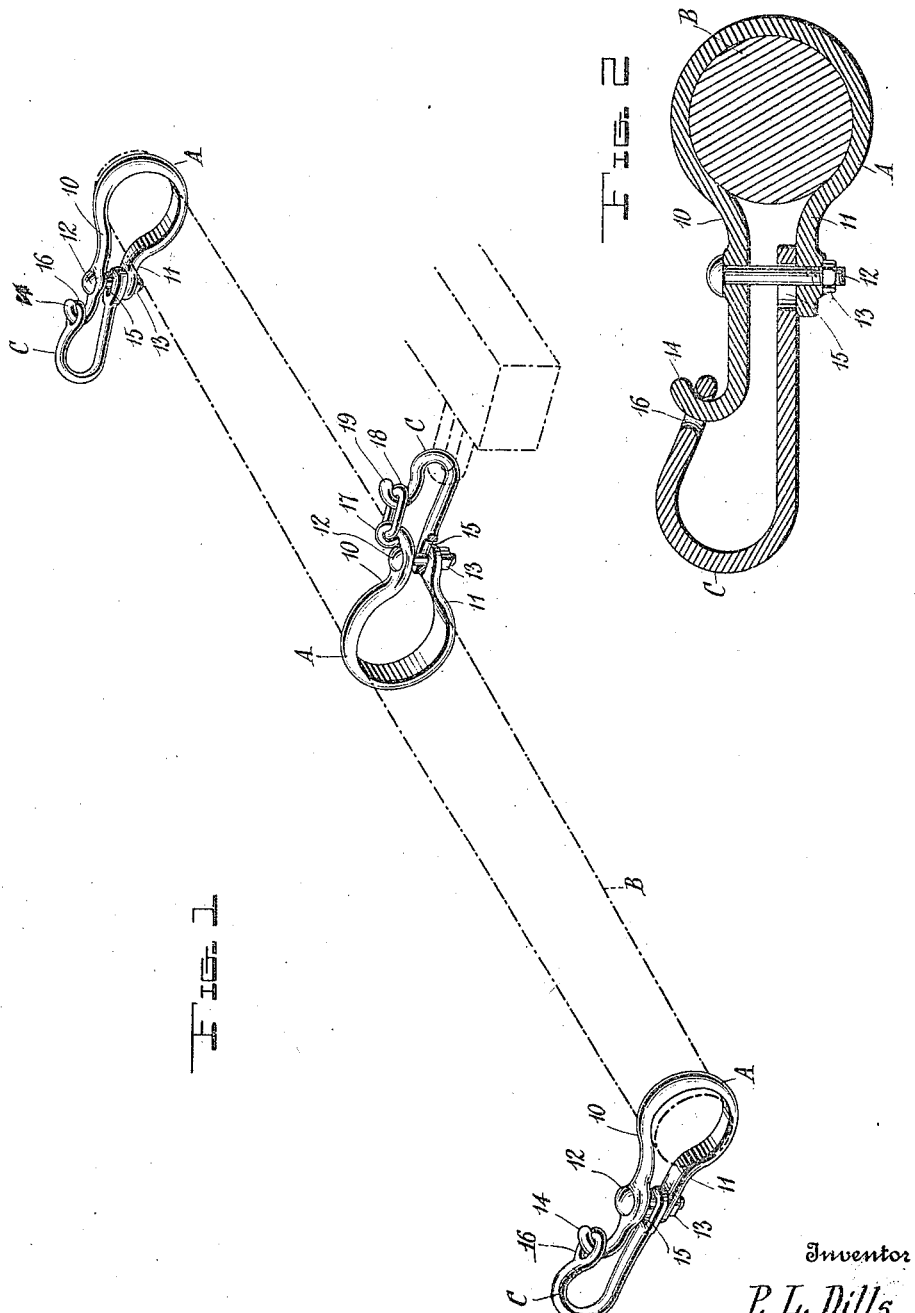

PHILIP L. DILLS, OF BLAIRSVILLE, GEORGIA.

HOOK.

1,015,149.

Specification of Letters Patent. Patented Jan. 16, 1912.

Application filed March 2, 1911. Serial No. 611,922.

*To all whom it may concern:*

Be it known that I, PHILIP L. DILLS, a citizen of the United States, residing at Blairsville, in the county of Union, State of Georgia, have invented certain new and useful Improvements in Hooks; and I do hereby declare the following to be a full, clear, and exact description of the invention, such as will enable others skilled in the art to which it appertains to make and use the same.

This invention relates to hooks.

The object of the invention resides in the provision of a hook which is adapted to be applied to the extremities of a swingletree for securing the traces thereto and to the central portion of a swingletree for securing the latter to a doubletree.

A further object of the invention resides in the provision of a hook which may be also applied to the extremities of a double tree to engage a suitable securing staple or link mounted upon the swingletree.

Finally, the object of the invention resides in the provision of a hook of the character named which may be easily engaged with the parts to be secured irrespective of the particular element upon which the hook is mounted.

With the above and other objects in view, the invention consists in the details of construction and arrangement and combination of parts to be hereinafter more fully described and particularly pointed out in the appended claim.

In describing the invention in detail, reference will be had to the accompanying drawing, wherein:

Figure 1 is a perspective view showing one form of the invention applied to the ends of a swingle tree for engagement with the traces and another modified form of the invention secured centrally of the swingletree and engaging a suitable securing staple on the end of the doubletree, said terminal of the doubletree and the entire swingletree being shown in dotted lines. Fig. 2 is a section through one of the hooks, applied to the end of the swingletree.

Referring first to the form of hook which is applied to the ends of the swingletree. A indicates a U-shaped clip which embraces the swingletree B and includes arms 10 and 11. These arms 10 and 11 are of a resilient nature and are connected together by means of a bolt 12 which has mounted on its projecting threaded end an adjusting nut 13, by means of which latter the arms 10 and 11 are forced toward each other so as to cause the clip A to bind firmly upon the swingletree B. The arm 10 of the clip A is extended and terminates in a hook shaped portion 14 for a purpose that will presently appear. A hook C has its shank disposed between the arms 10 and 11 and provided with an elongated longitudinal slot 15, through which the bolt 12 passes and whereby said hook is capable of a limited amount of independent movement with respect to the clip A. The free end of the hook C is provided with an elongated opening or eye 16 which is of a size sufficient to receive the hook terminal 14 of the arm 10. It will be noted that by reason of the freedom of movement permitted to the hook C by the slot 15 that the free end of said hook may be shifted to an extent that will permit the eye 16 to be passed over the hook terminal 14 of the arm 10 so as to secure the free end of the hook C against disengagement from the hook terminal 14.

In use, before effecting the engagement between the free end of the hook C and the hook terminal 14 of the arm 10, the trace link is engaged by the hook C and then the engagement between the free end of said hook and the hook terminal 14 is had which will effectively secure the trace to the hook C and in turn to the swingletree and likewise prevent its disengagement therefrom until the manual disengagement of the free end of the hook C from the hook terminal 14.

In the form of hook employed to secure the swingletree to the doubletree, the arm 10 of the clip A is bent at its free end to form an eye 17 in which is mounted a link 18. The hook C in this form has its stem secured between the arms 10 and 11 of the clip A in exactly the manner heretofore described but the free end of said hook terminates in an outwardly bent portion 19 which is adapted to be engaged by the link 18 which is passed over the free end of said outwardly bent portion.

In the use of the form of hook last described, the hook member C is engaged with a suitable securing staple on the end of the doubletree and said hook member is then moved so as to permit the link 18 to be passed over the portion 19 and when the link is so disposed, it will effectually prevent the disengagement of the hook member C from the securing staple of the doubletree.

What is claimed is:—

A device of the class described comprising a U-shaped clip, a bolt extending through the arms of said clip, a nut adjustably mounted on the bolt for forcing the arms of the clip together, a hook having its shank disposed between the arms of the clip and provided with a longitudinal slot through which the bolt extends, and means for connecting the free end of the hook with one of the arms of the clip to close the mouth of the former.

In testimony whereof, I affix my signature, in presence of two witnesses.

PHILIP L. DILLS.

Witnesses:
J. A. BUTT,
N. F. BRACKETT.